United States Patent
Mulder et al.

(10) Patent No.: US 10,922,065 B1
(45) Date of Patent: Feb. 16, 2021

(54) METHODS AND SYSTEMS FOR IDENTIFYING SOFTWARE PRODUCT INSTALLATION INSTANCES

(71) Applicant: 2236008 Ontario Inc., Waterloo (CA)

(72) Inventors: Duane Mulder, Ottawa (CA); Aaron Humphrey Pesa, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/598,137

(22) Filed: Oct. 10, 2019

(51) Int. Cl.
  *G06F 8/61* (2018.01)
(52) U.S. Cl.
  CPC .................................. *G06F 8/61* (2013.01)
(58) Field of Classification Search
  USPC ........................................................ 717/177
  See application file for complete search history.

(56) References Cited

U.S. PATENT DOCUMENTS

| | | | |
|---|---|---|---|
| 8,010,083 B2 | 8/2011 | Descombes et al. | |
| 8,751,644 B2 * | 6/2014 | Bornhoevd | G06F 9/54 709/224 |
| 8,949,827 B2 | 2/2015 | Becker et al. | |
| 8,984,504 B2 | 3/2015 | Becker et al. | |
| 9,305,147 B1 | 4/2016 | Azmat et al. | |
| 2016/0359628 A1 | 12/2016 | Singh et al. | |
| 2017/0063731 A1 * | 3/2017 | Muller | H04L 41/0668 |

OTHER PUBLICATIONS

"Heartbeat Mechanism"; Oracle.com website as captured by the Wayback Machine Internet Archive (archive.org)[full url in ref.]; Mar. 3, 2017 (Year: 2017).*

* cited by examiner

*Primary Examiner* — Qing Chen
*Assistant Examiner* — Clint Thatcher
(74) *Attorney, Agent, or Firm* — Rowand LLP

(57) ABSTRACT

Methods and systems for identifying individual installation instances of a software product. A plurality of consecutive heartbeat messages is received from an installation instance. Each heartbeat message includes a respective identifier that was transmitted to the installation instance in response to a previous heartbeat message. In response to each heartbeat message, a unique identifier is generated. The unique identifier is linked, in a historical list of identifiers, to the respective identifier. The unique identifier is also transmitted to the installation instance to be used as the next identifier in the plurality of heartbeat messages.

20 Claims, 6 Drawing Sheets

METHODS AND SYSTEMS FOR IDENTIFYING SOFTWARE PRODUCT INSTALLATION INSTANCES

FIELD

The present application generally relates to software product installations, and more particularly, to identifying individual installation instances of a software product.

BACKGROUND

Software products may be distributed under a software license. The terms of a software license are often based on the usage of the software according to one or more metrics. A common metric is the number of installations of a software product.

The ability to accurately count the number of installations of a software product can be important. One way to count the installations of a software product is to configure the software product to contact a license server when the product is active and running. The software product can provide the license server with information identifying the computing device that is hosting the installation, such as an Internet Protocol (IP) address assigned to the device or a media access control (MAC) address of the device, which is a unique identifier assigned to a network interface controller. The license server is able to use this information to count the number of devices the software product is installed on.

Unfortunately, sometimes a software product is installed on a virtual machine that is later cloned. When a virtual machine is cloned, both the parent and cloned virtual machines may have the same IP and MAC addresses. It may not be possible for the license server to distinguish between two separate installations of the software product as the two virtual machines may share the same configuration.

It would be advantageous to provide for enhanced accuracy of identifying unique instances of an installed software product.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
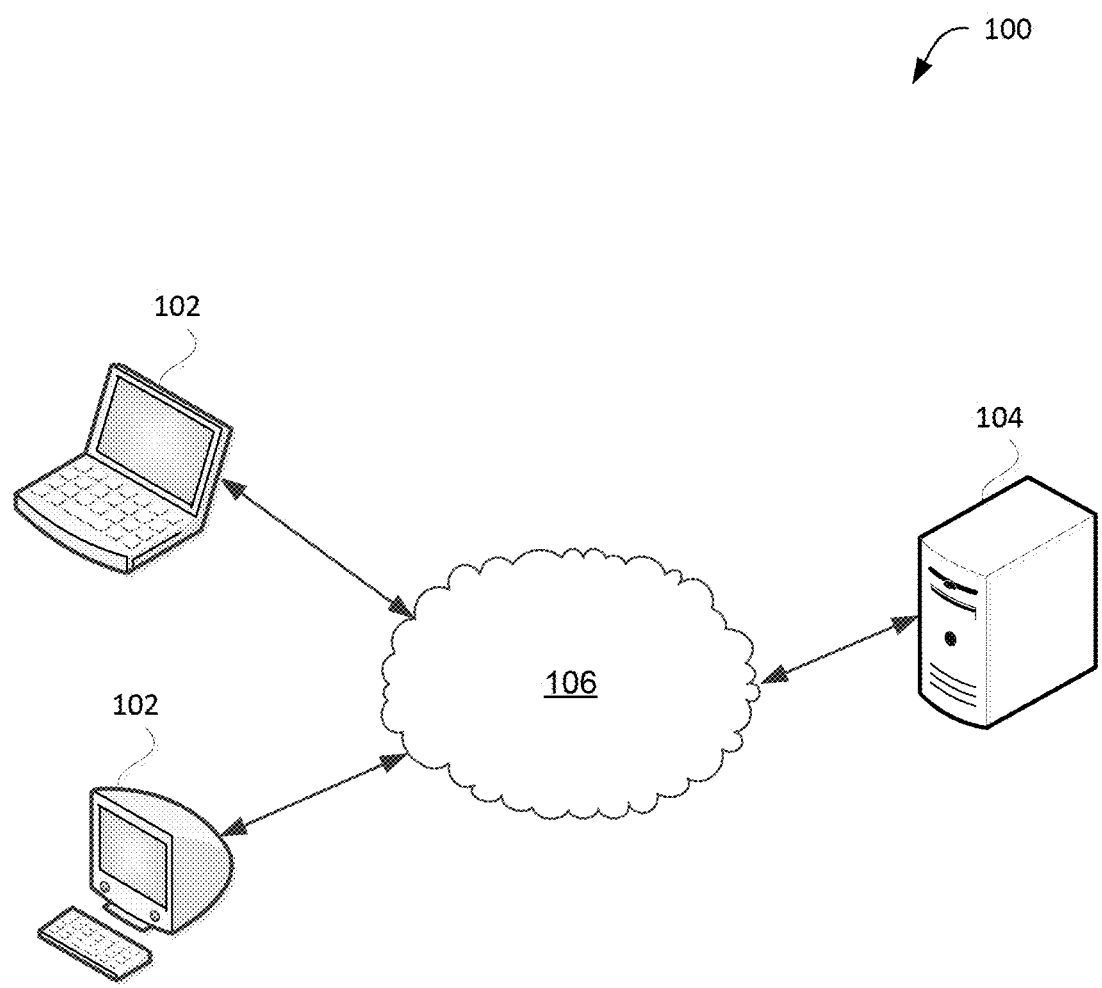
FIG. 1 shows a schematic diagram illustrating an operating environment of an example embodiment.

In a first aspect, the present application describes a computer-implemented method of identifying an installation instance of a software product. The method may include receiving a plurality of consecutive heartbeat messages from the installation instance indicating that the installation instance is running, each particular heartbeat message of the plurality of heartbeat messages comprising a respective identifier transmitted to the installation instance in response to a previous heartbeat message in the plurality of heartbeat messages; and in response to receiving each particular heartbeat message of the plurality of heartbeat messages: generating a unique identifier; linking, in a historical list of identifiers, the unique identifier to the respective identifier in the particular heartbeat message; and transmitting the unique identifier to the installation instance to be used as the next identifier in the plurality of heartbeat messages.

In some implementations, the linking, in the historical list of identifiers, the unique identifier to the respective identifier in the particular heartbeat message includes appending the unique identifier to the historical list of identifiers.

In some implementations, the installation instance is a first installation instance and the method may include receiving a heartbeat message from a second installation instance of the software product indicating that the second installation instance is running, the heartbeat message includes one of the unique identifiers transmitted to the first installation instance; and in response to receiving the heartbeat message from a second installation instance: generating a unique identifier for use as the identifier in a next heartbeat message from the second installation instance; linking, in the historical list of identifiers, the unique identifier to the one of the unique identifiers transmitted to the first installation instance; and transmitting the unique identifier to the second installation instance for use as the identifier in the next heartbeat message from the second installation instance.

In some implementations, one of the first installation instance and the second installation instance is installed on a device and the other installation instance is installed on a clone of the device.

In some implementations, the method may further include, in response to receiving each particular heartbeat message of the plurality of heartbeat messages, prior to linking, in the historical list of identifiers, the unique identifier for transmission to the second installation instance to the one of the unique identifiers transmitted to the first installation instance: determining that the respective identifier in the particular heartbeat message corresponds to an entry in the historical list of identifiers.

In some implementations, the method may further include, in response to receiving each particular heartbeat message of the plurality of heartbeat messages, prior to linking, in the historical list of identifiers, the unique identifier for transmission to the second installation instance to the one of the unique identifiers transmitted to the first installation instance: determining that the respective identifier in the particular heartbeat message does not correspond to an entry in the historical list of identifiers; and generating a notification indicating a violation of a software license agreement.

In some implementations, each message of the plurality of heartbeat messages is received at a regular interval. In some implementations, the method may further include associating each unique identifier with a timestamp. In some implementations, the method may further include determining a software license violation based on the historical list of identifiers and the timestamps.

In some implementations, the method may further include generating a notification indicating the number of installation instances of the software product over a particular period of time.

In another aspect, there may be provided a system for identifying an installation instance of a software product. The system may include a memory and a processor coupled with the memory, the processor configured to receive a plurality of consecutive heartbeat messages from the installation instance indicating that the installation instance is running, each particular heartbeat message of the plurality of heartbeat messages comprising a respective identifier transmitted to the installation instance in response to a previous heartbeat message in the plurality of heartbeat messages; and in response to receiving each particular heartbeat message of the plurality of heartbeat messages: generate a unique identifier; link, in a historical list of identifiers, the unique identifier to the respective identifier in the particular heartbeat message; and transmit the unique identifier to the installation instance to be used as the next identifier in the plurality of heartbeat messages. In some implementations, each message of the plurality of heartbeat messages is received at a regular interval.

In some implementations, the processor may be configured to link, in the historical list of identifiers, the unique identifier to the respective identifier in the particular heartbeat message comprises the processor configured to append the unique identifier to the historical list of identifiers.

In some implementations, the installation instance is a first installation instance, and the processor may be further configured to receive a heartbeat message from a second installation instance of the software product indicating that the second installation instance is running, the heartbeat message comprising one of the unique identifiers transmitted to the first installation instance; and in response to receiving the heartbeat message from a second installation instance: generate a unique identifier for use as the identifier in a next heartbeat message from the second installation instance; link, in the historical list of identifiers, the unique identifier to the one of the unique identifiers transmitted to the first installation instance; and transmit the unique identifier to the second installation instance for use as the identifier in the next heartbeat message from the second installation instance. In some implementations, one of the first installation instance and the second installation instance is installed on a device and the other installation instance is installed on a clone of the device.

In some implementations, the processor may be further configured to, in response to receiving each particular heartbeat message of the plurality of heartbeat messages, prior to linking, in the historical list of identifiers, the unique identifier for transmission to the second installation instance to the one of the unique identifiers transmitted to the first installation instance: determine that the respective identifier in the particular heartbeat message corresponds to an entry in the historical list of identifiers.

In some implementations, the processor may be further configured to, in response to receiving each particular heartbeat message of the plurality of heartbeat messages, prior to linking, in the historical list of identifiers, the unique identifier for transmission to the second installation instance to the one of the unique identifiers transmitted to the first installation instance: determine that the respective identifier in the particular heartbeat message does not correspond to an entry in the historical list of identifiers; and generate a notification indicating a violation of a software license agreement.

In some implementations, the processor may be further configured to associate each unique identifier with a timestamp; and determine a software license violation based on the historical list of identifiers and the timestamps.

In some implementations, the processor may be further configured to generate a notification indicating the number of installation instances of the software product over a particular period of time.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, reference is made to a "software product", which is intended to include one or more software modules. In some cases, a software module is an operating system software or an application. A software module may be off-the-shelf software or custom-built software. In some embodiments, a software product may be software that is licensed and covered by a software licensing agreement.

In the present application, reference may be made to an "installation instance" of a software product. An installation instance may represent a single installation of the software product. In some cases, a device may have multiple installations of a software product, in which case the device may be said to host multiple installation instances of the software product. An installation instance is understood to include a software product installed on a virtual machine.

In the present application, reference may be made to a "cloned" device. When a device is cloned, the original device may be referred to as the parent device. The copy of the original device may be referred to as the cloned device. In some embodiments, the device may be a virtual machine. A virtual machine may be cloned by creating a copy of the virtual machine. The original virtual machine may be referred to as the parent virtual machine or parent device. The copy of the virtual machine may be referred to as the cloned virtual machine or the cloned device.

When device has a single installation instance of a software product and the device is cloned, the cloned device also has a single installation instance of the software product. In this particular case, there are a total of two installation instances of the software product, one on the parent device and one on the cloned device.

In the present application, reference may be made to a "heartbeat". A heartbeat may refer to an automated communication that is sent periodically by a software program installation instance, and received by a server, indicating that the installation instance is up and running. The time at which a heartbeat is sent may be substantially the same as the arrival time of the heartbeat at the server. In some cases, the communication is sent/received at a scheduled or regular interval, for example, every ten seconds, every hour, or every seven days. In some cases, the communication is sent/received at a regular interval at a scheduled time, for example, every day at noon or every hour on the hour. In some cases, the heartbeats are sent/received based on a defined a minimum and/or maximum interval between heartbeats, for example, no more than seven days between consecutive heartbeats. An interval may be a defined length of time. In some embodiments, the defined length of time may range from a few seconds to a week, or longer.

Reference will now be made to FIG. 1, which diagrammatically illustrates an example system 100 for identifying a software product installation instance. The system 100 in this example includes two license client devices 102 and a license server 104.

Although the license client devices 102 and the license server 104 are depicted as being implemented by particular devices such as a laptop computer and a desktop computer, it will be understood that the devices 102 and server 104 may be implemented by one or more computing devices, including servers, personal computers, tablets, smartphones, connected cars, Internet-of-things devices, or any other such devices.

A licensed software product may be installed on each of the license client devices 102. In some embodiments, the software product is installed on a virtual machine and separate copies of the virtual machine are installed on each of the license client devices 102.

The system 100 further includes a network 106. The network 106 allows the license client devices 102 to communicate with the license server 104. The license server 104 may be configured to receive and respond to communications from the licensed software product installation on the license client devices 102. The license server 104 may be further configured to observe and report the number of installation instances of the licensed software product.

Figure 2:
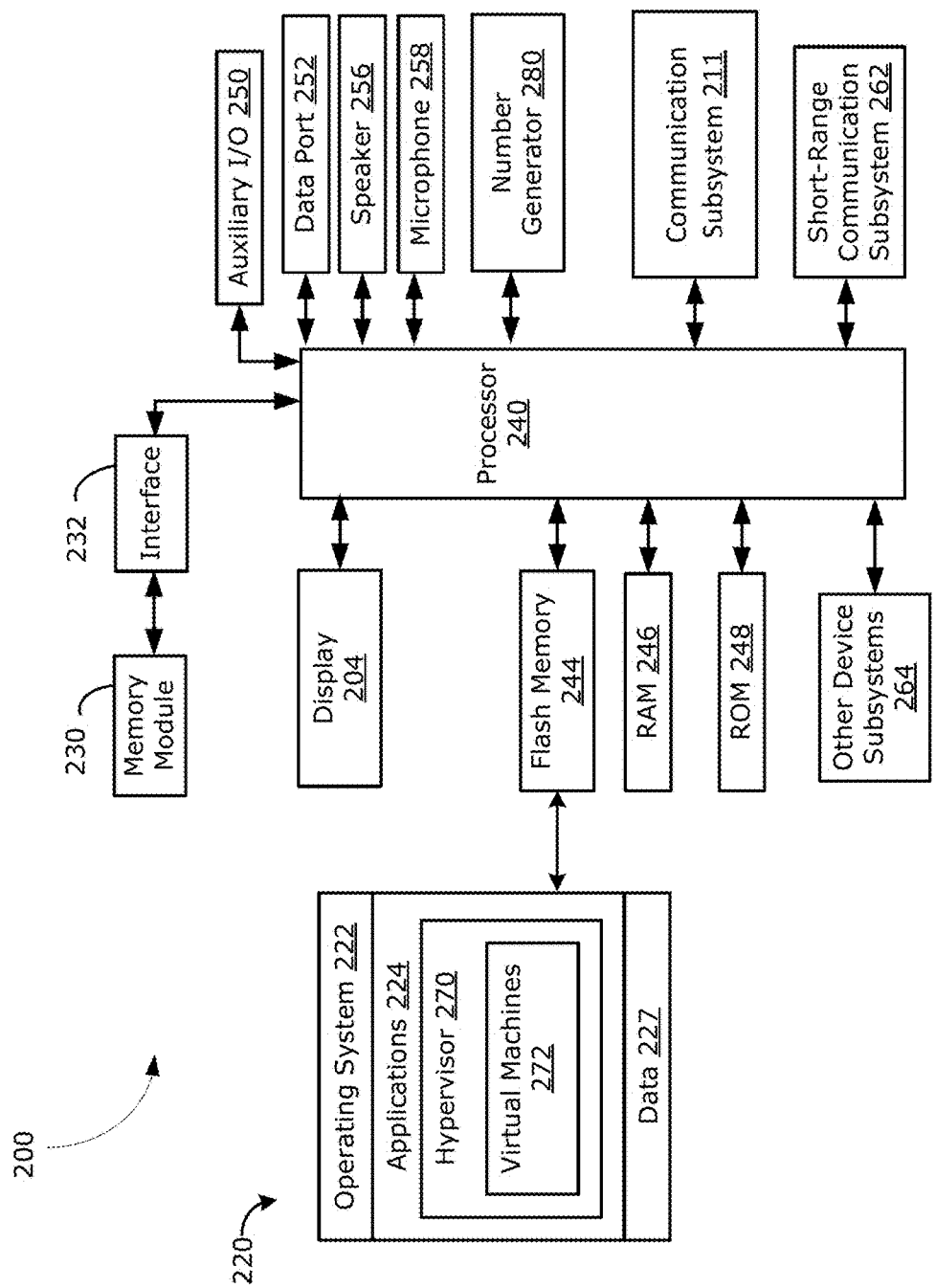
FIG. 2 is a block diagram illustrating components of an example embodiment of each of the computing devices of FIG. 1.

Reference is made to FIG. 2, which illustrates a block diagram of an example embodiment of each of the computing devices of FIG. 1, namely the license client devices 102 and the license server 104. The computing device may be configured for two-way communication, having data and optionally voice communication capabilities, and the capability to communicate with other computer systems, e.g. via the internet. In some embodiments, the computing device 100 may take one of any number of forms, such as a computer, tablet, laptop, smartphone, smartwatch, or any other electronic device configured for connection over wireless networks.

The computing device 200 of FIG. 2 may include a housing (not shown) which houses components of the computing device 200. Internal components of the computing device 200 may be constructed on a printed circuit board (PCB). The computing device 200 includes a controller including at least one processor 240 (such as a microprocessor) which controls the overall operation of the computing device 200. The processor 240 interacts with device subsystems, such as a wireless communication subsystem 211, for exchanging radio frequency signals with a wireless network to perform communication functions. The processor 240 interacts with additional device subsystems including one or more input interfaces (which may include, without limitation, any of the following: a keyboard, one or more control buttons, one or more microphones 258, a gesture sensor, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces (such as a display 204), one or more speakers 256, or other output interfaces), a short-range communication subsystem 262, and other device subsystems generally designated as 264.

In some example embodiments, the auxiliary input/output (I/O) subsystems 250 may include an external communication link or interface, for example, an Ethernet connection. The communication subsystem 211 may include other wireless communication interfaces for communicating with other types of wireless networks, e.g. Wi-Fi networks.

In some example embodiments, the computing device 200 also includes a removable memory module 230 (typically including flash memory) and a memory module interface 232. Network access may be associated with a subscriber or user of the computing device 200 via the memory module 230, which may be a Subscriber Identity Module (SIM) card for use in a GSM network or other type of memory module for use in the relevant wireless network type. The memory module 230 may be inserted in or connected to the memory module interface 232 of the computing device 200.

The computing device 200 may store data 227 in an erasable persistent memory, which in one example embodiment is the flash memory 244. In some example embodiments, the data 227 may include service data having information required by the computing device 200 to establish and maintain communication with a wireless network. The data 227 may also include user application data such as messages (e.g. emails, texts, multimedia messages, etc.), address book and contact information, calendar and schedule information, notepad documents, image files, and other commonly stored user information stored on the computing device 200 by its users, and other data.

The data 227 stored in the persistent memory (e.g. flash memory 244) of the computing device 200 may be organized, at least partially, into a number of databases or data stores each containing data items of the same data type or associated with the same application. For example, identifiers may be stored in individual files within the computing device 200 memory.

The short-range communication subsystem 262 provides for communication between the computing device 200 and different systems or devices, which need not necessarily be similar devices. For example, the short-range communication subsystem 262 may include an infrared device and associated circuits and components, a wireless bus protocol compliant communication mechanism such as a Bluetooth® communication module to provide for communication with similarly-enabled systems and devices, and/or a near-field communication (NFC) interface.

A set of applications that control basic device operations, including data and possibly voice communication applications, may be installed on the computing device 200 during or after manufacture. Additional applications and/or upgrades to an operating system 222 or software applications 224 may also be loaded onto the computing device 200 through the wireless network, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

The processor 240 operates under stored program control and executes software modules 220 stored in memory such as persistent memory, e.g. in the flash memory 244. As illustrated in FIG. 2, the software modules 220 may include operating system software 222 and one or more applications 224 (or modules). Specific examples of applications that may be resident on the computing device 200 include a hypervisor application 270, an email messaging application, a database application, or an Internet browser application. The software modules 220 may be off-the-shelf or custom-built.

The operating system software 222 may provide a file system for storing, modifying and accessing files held in the persistent memory (e.g. flash memory 244) of the computing device 200. This file system may be accessible to other programs running on the processor 240 via a programmatic interface provided by the operating system software 222.

The hypervisor application 270 may manage and run one or more virtual machines 272. Each of the virtual machines 272 may include one or more software modules such as software modules 220.

The number generator 280 may be a hardware random number generator (HRNG) for generating random numbers.

Figure 3:
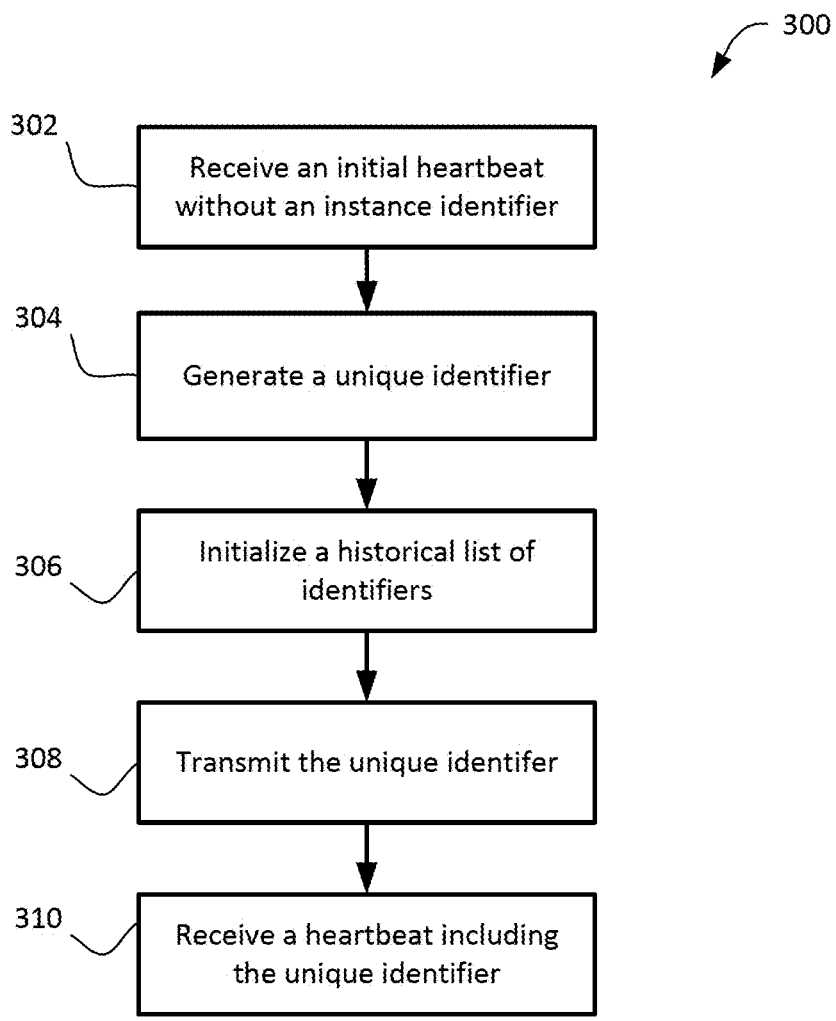
FIG. 3 shows a flowchart of a simplified example method of identifying a software product installation instance where the installation instance starts up for the first time and the heartbeat message includes no instance identifier.

Reference is now made to FIG. 3, which shows, in flowchart form, a simplified example of a method 300 of identifying a software product installation instance involving an initial heartbeat message that includes no instance identifier. The initial heartbeat message exchange is sometimes referred to as a handshake. The software product installation instance initiates the message exchange by transmitting a heartbeat message to a server. The server receives the heartbeat message and transmits a reply message to the installation instance in response. The example method 300 may be implemented by one or more servers suitably programmed to carry out the functions described.

Typically, each time an installation instance of a software program starts, the software program loads an instance identifier from a data store and sends a heartbeat to the license server along with the instance identifier. In some cases, the term "instance identifier" may refer to an identifier generated by a license server and transmitted from the license server in response to a prior or previous heartbeat message. However, the first time the installation instance starts, the installation instance may not have an instance identifier to send to the server and, accordingly, may transmit an initial heartbeat message to the server with no instance identifier. The heartbeat message may be treated by the server as a request for an instance identifier.

In operation 302, the server receives the initial heartbeat message from the installation instance indicating that the installation instance is running In this example, no instance identifier is received by the server. In some embodiments, a heartbeat may include other identifiers and information associated with the heartbeat and the installation instance, such as a product key, a software product identifier, license information, an IP address, a MAC address, and/or other information about the device on which the installation instance is running, In operation 304, the server generates a unique identifier. The unique identifier may be generated using, for example, a pseudorandom number generator (PRNG), or a hardware random number generator (HRNG), that creates a number to be used as the unique identifier.

The unique identifier may be associated with a timestamp and information received with the heartbeat. The timestamp may correspond to the time and date the heartbeat message was received from the installation instance, the time and date the unique identifier was obtained, or any other suitable time and date.

In operation 306, the server creates a historical list of identifiers and adds the unique identifier to the list. In other words, a historical list of identifiers may be initialized to include the unique identifier. For example, referring to the example historical list of identifiers shown diagrammatically in FIG. 5, the historical list of identifiers 500 may be created and the unique identifier "A1" may be added as the first identifier 502 in the list. Other identifiers may be added to the list in response to subsequent heartbeats.

In operation 308, the server replies to the installation instance by transmitting the unique identifier to the installation instance. The transmitted unique identifier is to be used as the instance identifier in the next heartbeat message sent from the installation instance, in other words, the heartbeat message that immediately follows the initial heartbeat message. The installation instance may store the unique identifier, now referred to as an instance identifier, in memory or a data store.

After startup of the installation instance and the initial heartbeat message exchange, the installation instance and the server may continue to exchange heartbeat messages. The exchanges may occur on a scheduled basis and at a regular interval, such as every seven days, or any other suitable interval.

In operation 308, the server receives the next heartbeat message from the installation instance. The heartbeat message includes the instance identifier. Put another way, the server receives back the unique identifier that was transmitted by the server in response to the previous heartbeat message received by the server. The operation 308 may correspond to the operation 402 of FIG. 4 and the method 300 may continue as shown in FIG. 4.

Figure 4:
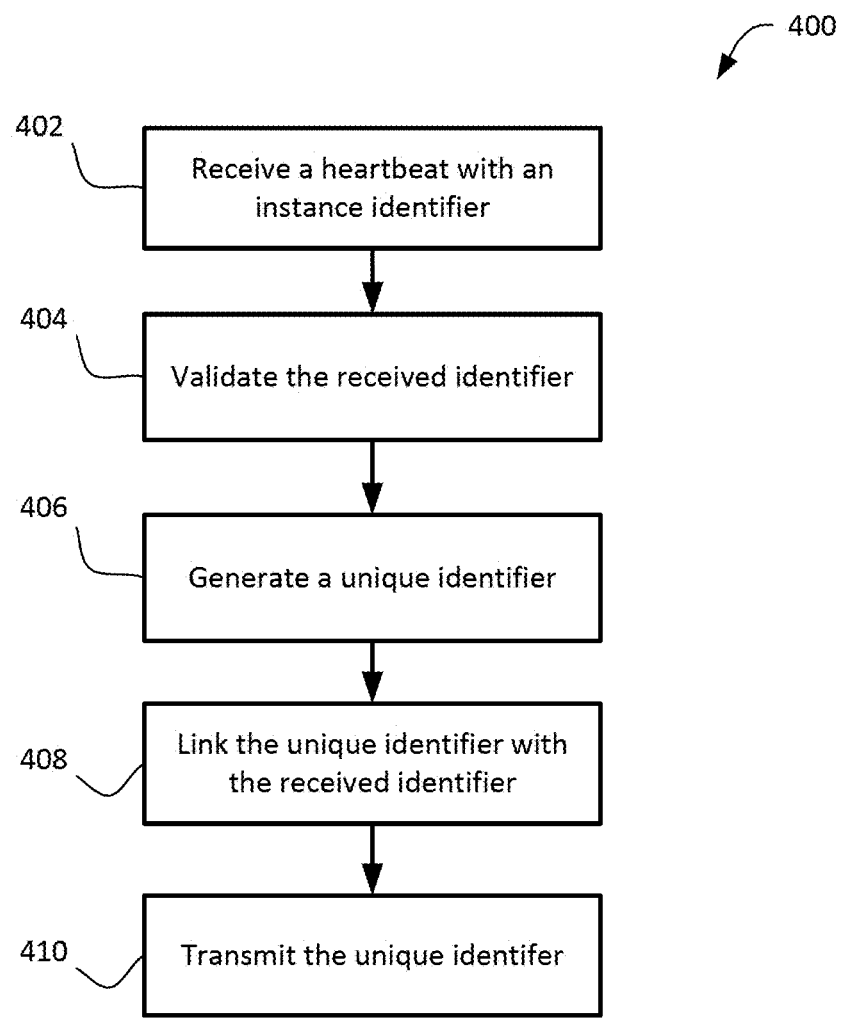
FIG. 4 shows a flowchart of another simplified example method of identifying a software product installation instance where the heartbeat message includes an instance identifier.

Reference is now made to FIG. 4, which shows, in flowchart form, a simplified example of a method 400 of identifying a software product installation instance. The example method 400 may be implemented by one or more servers suitably programmed to carry out the functions described.

An installation instance may transmit a heartbeat message that includes the identifier, sometimes referred to as the instance identifier, received by the installation instance in reply to the previous heartbeat message transmitted by the installation instance to the server. In other words, the installation instance transmits to the server the identifier received in response to the heartbeat message that immediately preceded the current heartbeat message.

In operation 402, the server receives a heartbeat message from the installation instance indicating that the installation instance is running. The message includes the identifier, sometimes referred to as the instance identifier or the received identifier, that was transmitted by the server in response to the previous heartbeat message received from the installation instance. It is understood that the heartbeat message may include additional information as described in the method 300 (FIG. 3).

In operation 404, the server may validate the received identifier to confirm that it is not forged. An identifier may be considered forged if it is not an identifier that was generated by the server or is not an identifier that was transmitted to an installation instance in response to a heartbeat message, or both. Validation of an identifier may be performed by determining that the identifier was generated by the server or was transmitted to an installation instance in response to a heartbeat message, or both. In some embodiments, the identifier is validated against one or more historical list of identifiers associated with the software program. If the identifier is not listed in any of the historical lists, it may be considered forged.

In some embodiments, in response to determining that the received identifier is not a valid identifier, the license server determines there is a violation of a software license agreement and generates a notification indicating a violation of a software license agreement. In some embodiments, the license server may track and monitor the installation instance by creating a new historical list of identifiers and adding the received identifier to the list as outlined in operation 306 (FIG. 3).

In operation 406, the server generates a unique identifier. The unique identifier may be generated using, for example, a PRNG or an HRNG that creates a number to be used as the unique identifier. In some embodiments, the unique identifier is generated based on a hash. The input to a hash function may include a random number, a timestamp, the received identifier and/or other information associated with the unique identifier, the received identifier, the heartbeat message, a previous or prior heartbeat message, and/or a historical list of identifiers.

Figure 5:
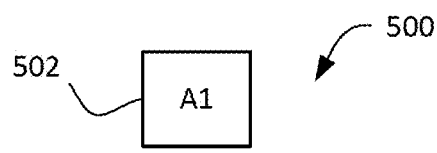
FIG. 5 diagrammatically shows an example historical list of identifiers that includes a single identifier.
Figure 6:
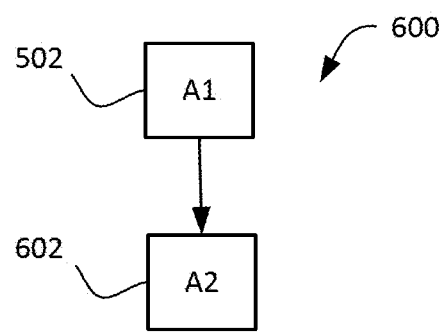
FIG. 6 diagrammatically shows an example historical list of identifiers that includes an identifier linked with another identifier.

In operation 408, the server links, in a historical list of identifiers, the unique identifier with the received identifier. The operation involves identifying a historical list of identifiers associated with the software product that includes the received identifier. In one example, the received identifier is the string "A1" and the unique identifier is the string "A2". Reference is now also made to FIG. 5 and FIG. 6. The identifier 502 in the historical list of identifiers 500 diagrammatically shown in FIG. 5 may be identified as matching the received identifier. The unique identifier 602 may be added to the historical list of identifiers 500 and linked to, or associated with, the identifier 502 to build the historical list of identifiers 600 diagrammatically shown in FIG. 6. Each unique identifier in the historical list of identifiers may be associated with a timestamp and/or other information received or associated with the heartbeat. Such associated information may also be included in the historical list of identifiers.

Various techniques and data structures may be implemented to link the unique identifier with the received identifier to form a series or sequence of instance identifiers in the historical list of identifiers. Accordingly, the historical list of identifiers tracks which unique identifiers were generated for each identifier that was transmitted by the server.

In some embodiments, the historical list is implemented as a tree data structure and linking may involve appending the unique identifier to a received identifier that is the leaf of the tree, such that the unique identifier references the received identifier, or the received identifier references the unique identifier, or both. Each node in the tree may also contain or be associated with a timestamp and/or other information received or associated with the heartbeat.

In some embodiments, the historical list may be implemented as a table or multidimensional array, where linking the unique identifier with the received identifier may involve adding or appending a row to the table. A new row may include the unique identifier, the received identifier if one was received, a timestamp and/or other information received or associated with the heartbeat. A unique identifier and a received identifier may be considered to be linked, or associated with each other, if they are entered into the same row.

The operation 410 of is similar to the operation 308 (FIG. 3). In operation 410, the server sends a response to the heartbeat message. The server transmits the unique identifier to the installation instance. The transmitted unique identifier is to be used as the instance identifier in the next heartbeat message sent from the installation instance.

The server may continue to receive a series of heartbeat messages from the installation instance. Each of the heartbeat messages may be handled in the manner described in the method 400. The server may receive, processes and respond to the heartbeat messages from a particular installation instance sequentially. For example, the server may receive, process and reply to a heartbeat message before receiving, processing and replying to the next heartbeat message from the same installation instance.

In some embodiments, the method 400 may be applied to a sequence of heartbeat messages from an installation instance. Each heartbeat message may include a different instance identifier. Each reply from the server may include a new unique identifier that replaces the old instance identifier and is used as the new instance identifier on the installation instance. In this manner, the same instance identifier is never transmitted by an installation instance more than once and the server never receives the same instance identifier from a particular installation instance more than once. The instance identifier effectively has a transient life span on the installation instance that begins when it is received in reply to a heartbeat and ends when it is transmitted in the next heartbeat and replaced by the new instance identifier received in the reply to the next heartbeat.

Figure 7:
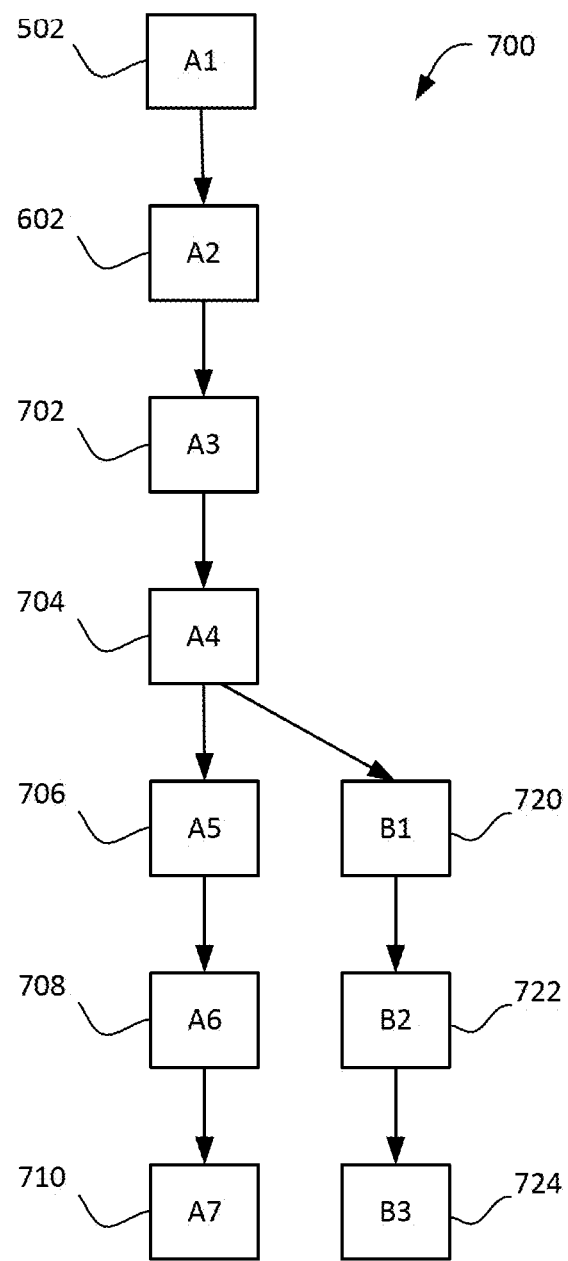
FIG. 7 diagrammatically shows an example historical list of identifiers that includes a branch.

Reference is now made to FIG. 7, which diagrammatically shows an example historical list of identifiers 700 that includes a branch. In some embodiments, the historical list of identifiers 700 is built according to the methods 300 and 400 of FIGS. 3 and 4.

The historical list of identifiers 700 may be created as described in relation to FIG. 5, and the first two identifiers 502 and 602 may be added as described in relation to FIGS. 5 and 6, respectively.

The historical list of identifiers 700 includes two more identifiers 702 and 704 that are correspond to two more heartbeat messages received by the license server from the installation instance. At this point, a cloning event occurs where the device hosting the installation instance is cloned. Both the parent device and the cloned device are identical and have the same instance identifier 704, which is represented by the string "A4". Accordingly, the instance identifier is no longer unique as a copy of the instance identifier exists on two separate installation instances, one on the parent device and one on the cloned device.

One of the installation instances transmits, from one of the parent device and the cloned device, a heartbeat message including the identifier "A4" to the license server. The message could be from either device. The license server processes the heartbeat message according to the method 400. The server receives the identifier "A4", generates the unique identifier "A5", links the identifier 706 to the identifier 704 which represents the received identifier "A4", and transmits the identifier "A5" to the installation instance that sent the heartbeat message. The same device transmits the instance identifier "A5" in the next heartbeat and receives the instance identifier "A6" in reply. Similarly, the device then transmits the instance identifier "A6" in its next heartbeat message and receives the instance identifier "A7" in reply. This results in two more identifiers 708 and 710 being linked in the historical list of identifiers 700.

The other installation instance also transmits a heartbeat message including the identifier "A4" to the license server. The license server processes the heartbeat message according to the method 400. The server receives the duplicate identifier "A4", generates the unique identifier "B1", and links the identifier 720 to the identifier 704 which represents the received identifier "A4". In this manner, duplicate identifiers may result in multiple unique identifiers being created that each reference or are linked with the same received identifier. The server further transmits the identifier "A5" to the installation instance that sent the heartbeat message. The historical list of identifiers 700 now includes a branch extending from the identifier 704. The next two heartbeat messages from the same installation instance results in identifiers 722 and 724 being appended to the branch.

It will be appreciated that in the case of the cloned installation instance, the method 400 as described may be modified. In particular, with respect to the initial heartbeat from the cloned installation instance, in operation 402 (FIG. 4), the received identifier (for example, the identifier "A4") is the identifier that was last transmitted to the parent installation instance prior to the cloning event. More broadly, the received identifier is an identifier that was generated by the server and/or transmitted by the server in response to a prior heartbeat message received from an installation instance. Those skilled in the art will recognize that the other variations may be necessary.

It will further be appreciated that the server may receive, process and reply to the heartbeat messages from two or more installation instances in parallel with each other. In other words, a consecutive sequence of heartbeats from one installation instance may be interleaved with a consecutive sequence of heartbeats from the other installation instance.

The historical list of identifiers 700 may be considered a living tree that is built to show the life of all installation instances associated with that tree. The tree can be traversed to determine the history of particular installation instances. Multiple historical list of identifiers may be associated with a particular software product. Each new installation that is not a copy of another installation may result in a separate historical list of identifiers 700. Each cloning event may result in a branch being developed due to the server receiving a duplicated instance identifier.

In some embodiments, the method 400 may include determining a software license violation based on the historical list of identifiers, including timestamps and/or other information associated with each unique identifier in the historical list. As one example, the historical list of identifiers may be used to determine the number of installation instances of a software product that existed over a particular time period. A software violation may occur if the number of installation instances exceeds a defined number.

In some embodiments, an "observe and report" licensing model may be applicable. In these embodiments, the method 400 may include observing the number of installation instances of the software product and generating a notification indicating the number of installation instances of the software product over a period of time.

In the example historical lists shown in FIGS. 6 and 7, the arrows between instance identifiers indicate the sequence in which instance identifiers were generated, added to the historical lists and transmitted to instance installations. Each arrow represents a parent-child relationship between two particular instance identifiers and points from a parent instance identifier to a child instance identifier that was generated and transmitted to an instance installation in response to the license server receiving the parent instance identifier. It is understood that various techniques, including those described above, can be used to store the parent-child relationships and link a child instance identifier to a parent instance identifier.

Historical lists can be used for a variety of different purposes. In some embodiments, historical lists are used to determine whether two particular installation instances or instance identifiers have the same origin. For example, when presented with the installation identifiers "A7" and "B3" in the historical list of identifiers shown in FIG. 7, each identifier can be located in the same historical list and, accordingly, can be identified as having a common origin. In addition, links to parent instance identifiers can be followed to trace the origins of "A7" and "B3" back to the same identifier, for example, "A4" or "A1".

Historical lists may also be used to determine the number of installation instances of a software product that were active or executed during a given period of time. This may be involve identifying the historical lists that are associated with a particular software product identifier and, in each identified historical list, identifying the instance identifiers that have a timestamp falling within the given period of time and further have no child instance identifiers that have a timestamp falling within that same period of time. The number of identified instance identifiers would correspond to the number of installation instances active during that time period.

It will be appreciated that some or all of the above-described operations of the various above-described example methods may be performed in response to other operations. For example, one or more of operations 304, 306 and 308 in the example method described in FIG. 3 may be performed in response to the operation 302. As another example, one or more of the operations 404, 406, 408 and 410 in the example method described in FIG. 4 may be performed in response to the operation 402.

It will be appreciated that it may be that some or all of the above-described operations of the various above-described example methods may be performed in orders other than those illustrated and/or may be performed concurrently without varying the overall operation of those methods. It will also be appreciated that some or all of the operations may be performed in realtime and that the license server may respond to heartbeat messages in realtime.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer-implemented method of identifying an installation instance of a software product, the method comprising:
   receiving a plurality of consecutive heartbeat messages from the installation instance indicating that the installation instance is running, each particular heartbeat message of the plurality of heartbeat messages comprising a respective identifier transmitted to the installation instance in response to a previous heartbeat message in the plurality of heartbeat messages; and
   in response to receiving each particular heartbeat message of the plurality of heartbeat messages:
      generating a unique identifier;
      linking, in a historical list of identifiers, the unique identifier to the respective identifier in the particular heartbeat message; and
      transmitting the unique identifier to the installation instance to be used as the next identifier in the plurality of heartbeat messages.

2. The method of claim 1, wherein linking, in the historical list of identifiers, the unique identifier to the respective identifier in the particular heartbeat message comprises appending the unique identifier to the historical list of identifiers.

3. The method of claim 1, wherein the installation instance is a first installation instance, further comprising:
   receiving a heartbeat message from a second installation instance of the software product indicating that the second installation instance is running, the heartbeat message comprising one of the unique identifiers transmitted to the first installation instance; and
   in response to receiving the heartbeat message from a second installation instance:
      generating a unique identifier for use as the identifier in a next heartbeat message from the second installation instance;
      linking, in the historical list of identifiers, the unique identifier to the one of the unique identifiers transmitted to the first installation instance; and
      transmitting the unique identifier to the second installation instance for use as the identifier in the next heartbeat message from the second installation instance.

4. The method of claim 3, wherein one of the first installation instance and the second installation instance is installed on a device and the other installation instance is installed on a clone of the device.

5. The method of claim 3, further comprising:
   in response to receiving each particular heartbeat message of the plurality of heartbeat messages, prior to linking, in the historical list of identifiers, the unique identifier for transmission to the second installation instance to the one of the unique identifiers transmitted to the first installation instance:
      determining that the respective identifier in the particular heartbeat message corresponds to an entry in the historical list of identifiers.

6. The method of claim 3, further comprising:
   in response to receiving each particular heartbeat message of the plurality of heartbeat messages, prior to linking, in the historical list of identifiers, the unique identifier for transmission to the second installation instance to the one of the unique identifiers transmitted to the first installation instance:
      determining that the respective identifier in the particular heartbeat message does not correspond to an entry in the historical list of identifiers; and
      generating a notification indicating a violation of a software license agreement.

7. The method of claim 1, wherein each message of the plurality of heartbeat messages is received at a regular interval.

8. The method of claim 1, further comprising associating each unique identifier with a timestamp.

9. The method of claim 8, further comprising determining a software license violation based on the historical list of identifiers and the timestamps.

10. The method of claim 1, further comprising:
    generating a notification indicating the number of installation instances of the software product over a particular period of time.

11. A system for identifying an installation instance of a software product, the system comprising:
    a memory;
    a processor coupled with the memory, the processor configured to:
       receive a plurality of consecutive heartbeat messages from the installation instance indicating that the installation instance is running, each particular heartbeat message of the plurality of heartbeat messages comprising a respective identifier transmitted to the installation instance in response to a previous heartbeat message in the plurality of heartbeat messages; and
       in response to receiving each particular heartbeat message of the plurality of heartbeat messages:
          generate a unique identifier;
          link, in a historical list of identifiers, the unique identifier to the respective identifier in the particular heartbeat message; and
          transmit the unique identifier to the installation instance to be used as the next identifier in the plurality of heartbeat messages.

12. The system of claim 11, wherein the processor configured to link, in the historical list of identifiers, the unique identifier to the respective identifier in the particular heartbeat message comprises the processor configured to append the unique identifier to the historical list of identifiers.

13. The system of claim 11, wherein the installation instance is a first installation instance, the processor further configured to:
    receive a heartbeat message from a second installation instance of the software product indicating that the second installation instance is running, the heartbeat message comprising one of the unique identifiers transmitted to the first installation instance; and
    in response to receiving the heartbeat message from a second installation instance:
       generate a unique identifier for use as the identifier in a next heartbeat message from the second installation instance;
       link, in the historical list of identifiers, the unique identifier to the one of the unique identifiers transmitted to the first installation instance; and transmit the unique identifier to the second installation instance for use as the identifier in the next heartbeat message from the second installation instance.

14. The system of claim 13, wherein one of the first installation instance and the second installation instance is installed on a device and the other installation instance is installed on a clone of the device.

15. The system of claim 13, the processor further configure to:
in response to receiving each particular heartbeat message of the plurality of heartbeat messages, prior to linking, in the historical list of identifiers, the unique identifier for transmission to the second installation instance to the one of the unique identifiers transmitted to the first installation instance:
determine that the respective identifier in the particular heartbeat message corresponds to an entry in the historical list of identifiers.

16. The system of claim 13, the processor further configured to:
in response to receiving each particular heartbeat message of the plurality of heartbeat messages, prior to linking, in the historical list of identifiers, the unique identifier for transmission to the second installation instance to the one of the unique identifiers transmitted to the first installation instance:
determine that the respective identifier in the particular heartbeat message does not correspond to an entry in the historical list of identifiers; and
generate a notification indicating a violation of a software license agreement.

17. The system of claim 11, wherein each message of the plurality of heartbeat messages is received at a regular interval.

18. The system of claim 11, the processor further configured to:
associate each unique identifier with a timestamp; and
determine a software license violation based on the historical list of identifiers and the timestamps.

19. The system of claim 11, the processor further configured to:
generate a notification indicating the number of installation instances of the software product over a particular period of time.

20. A non-transitory computer-readable storage medium storing processor-executable instructions to identify an installation instance of a software product, wherein the processor-executable instructions, when executed by a processor, are to cause the processor to:
receive a plurality of consecutive heartbeat messages from the installation instance indicating that the installation instance is running, each particular heartbeat message of the plurality of heartbeat messages comprising a respective identifier transmitted to the installation instance in response to a previous heartbeat message in the plurality of heartbeat messages; and
in response to receiving each particular heartbeat message of the plurality of heartbeat messages:
generate a unique identifier;
link, in a historical list of identifiers, the unique identifier to the respective identifier in the particular heartbeat message; and
transmit the unique identifier to the installation instance to be used as the next identifier in the plurality of heartbeat messages.

* * * * *